United States Patent
Holme et al.

(10) Patent No.: US 11,710,164 B2
(45) Date of Patent: Jul. 25, 2023

(54) ELECTRONIC ORDERING SYSTEM AND METHOD

(71) Applicant: LEGO A/S, Billund (DK)

(72) Inventors: Søren Holme, Vejle (DK); Klaus Peter Rotne, Vejle (DK); Fredrik Björkenfors, Mölndal (SE); Johan Sanneblad, Torslanda (SE); Mikael Cederbom, Mölndal (SE); Ola Janson, Gothenburg (SE); Mattias Reintz, Allingås (SE); Johan Cedmar Brandstedt, Billdal (SE); Mats Sällström, Gothenburg (SE); Cari Johansson, Mölndal (SE)

(73) Assignee: LEGO A/S, Billund (DK)

( * ) Notice: Subject to any disclaimer, the term of this patent is extended or adjusted under 35 U.S.C. 154(b) by 161 days.

(21) Appl. No.: 17/383,844

(22) Filed: Jul. 23, 2021

(65) Prior Publication Data

US 2021/0350435 A1 Nov. 11, 2021

Related U.S. Application Data

(62) Division of application No. 16/481,793, filed as application No. PCT/EP2018/052788 on Feb. 5, 2018, now Pat. No. 11,132,728.

(30) Foreign Application Priority Data

Feb. 6, 2017 (DK) .......................... PA 2017 70070

(51) Int. Cl.
*G06Q 30/00* (2023.01)
*G06Q 30/0601* (2023.01)

(52) U.S. Cl.
CPC ..... *G06Q 30/0621* (2013.01); *G06Q 30/0633* (2013.01)

(58) Field of Classification Search
CPC .................................................. G06Q 30/0621
See application file for complete search history.

(56) References Cited

U.S. PATENT DOCUMENTS 3,005,282 A 10/1961 Christiansen
8,854,362 B1 10/2014 Poursohi et al.
(Continued)

FOREIGN PATENT DOCUMENTS

CN 104888469 B 9/2015
WO 2013/110942 A1 8/2013
(Continued)

OTHER PUBLICATIONS

Resnick, Mitchel, et al. "Lego, Logo, and Design." Children's Environments Quarterly, vol. 5, No. 4, 1988, pp. 14-18. JSTOR, www.jstor.org/stable/41514692. Accessed Apr. 23, 2021.*
(Continued)

*Primary Examiner* — Kathleen Palavecino
(74) *Attorney, Agent, or Firm* — Day Pitney LLP; Anthony A. Kassas

(57) ABSTRACT

The system includes a plurality of toy construction elements, a scanning device operable to capture a digital representation of a toy construction model constructed from one or more of said toy construction elements, and a processor. The processor is configured to determine, from the digital representation, one or more attribute parameters, each indicative of a respective attribute derivable from one or more toy construction elements in the toy construction model. The processor is further configured to determine, based on the determined one or more attribute parameters, a selection of one or more items selected from a choice of items. The selection provides a definition of the one or more deliverables. The system further comprises transmission means adapted to pass the definition to a production facility for
(Continued)

producing and configuring the one or more deliverables in agreement with the definition.

18 Claims, 5 Drawing Sheets

(56) References Cited

U.S. PATENT DOCUMENTS

| | | |
|---|---|---|
| 9,031,867 B1 | 5/2015 | Crawford |
| 9,117,231 B2 | 8/2015 | Rodgers et al. |
| 9,158,389 B1 | 10/2015 | Sharma et al. |
| 9,361,067 B1 | 6/2016 | Yano |
| 9,384,505 B1 | 7/2016 | Cao |
| 2008/0201241 A1 | 8/2008 | Pecoraro |
| 2010/0117806 A1 | 5/2010 | Hong |
| 2011/0258058 A1 | 10/2011 | Carroll et al. |
| 2012/0306853 A1 | 12/2012 | Wright et al. |
| 2013/0173389 A1 | 7/2013 | Page et al. |
| 2013/0203043 A1 | 8/2013 | Ozcan et al. |
| 2013/0218692 A1 | 8/2013 | Fischer |
| 2014/0006182 A1 | 1/2014 | Wilson |
| 2014/0022248 A1* | 1/2014 | Kuffner, Jr. ............. G06T 17/20 345/420 |
| 2014/0329598 A1* | 11/2014 | Horovitz ................. G06F 18/00 463/31 |
| 2015/0277154 A1 | 10/2015 | Hofmeister et al. |
| 2015/0331888 A1 | 11/2015 | Shomair |
| 2015/0339532 A1 | 11/2015 | Sharma et al. |
| 2015/0363854 A1 | 12/2015 | Wang |
| 2016/0085518 A1 | 3/2016 | Jang |
| 2016/0125558 A1 | 5/2016 | Clyburn |
| 2016/0189461 A1 | 6/2016 | Kanon et al. |
| 2016/0282901 A1 | 9/2016 | Sharma et al. |
| 2017/0144083 A1 | 5/2017 | Kærsgaard et al. |

FOREIGN PATENT DOCUMENTS

| | | |
|---|---|---|
| WO | 2015/185629 A2 | 12/2015 |
| WO | 2016/075081 A1 | 5/2016 |

OTHER PUBLICATIONS

Resnick, Mitchel et al., "Lego, Logo, and Design." Children's Environments Quarterly, vol. 5, No. 4, 1988, pp. 14-18. JSTOR, URL: www.jstor.org/stable/41514692 Accessed Apr. 23, 2021.
Miller et al., "Interactive 3D Model Acquisition and Tracking of Building Block Structures", IEEE Transactions on Visualization and Computer Graphics, 18:4, 10 pp, Apr. 2012.
Examination and Search Reports issued in Danish patent application No. PA 201770070, 8 pp, dated Aug. 11, 2017.
International Search Report issued in international application No. PCT/EP2018/052788, 4 pp, dated Apr. 16, 2018.
Written Opinion issued in international application No. PCT/EP2018/052788, 8 pp, dated Apr. 16, 2018.
International Preliminary Report on Patentability, including a Response to the International Search Report and the Written Opinion with amended claims, dated Apr. 8, 2017.

* cited by examiner

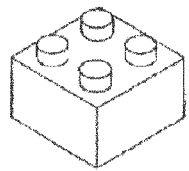
FIG. 1 - PRIOR ART
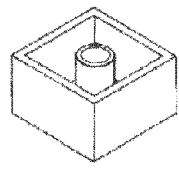
FIG. 2
PRIOR ART
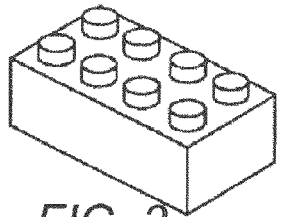
FIG. 3
PRIOR ART
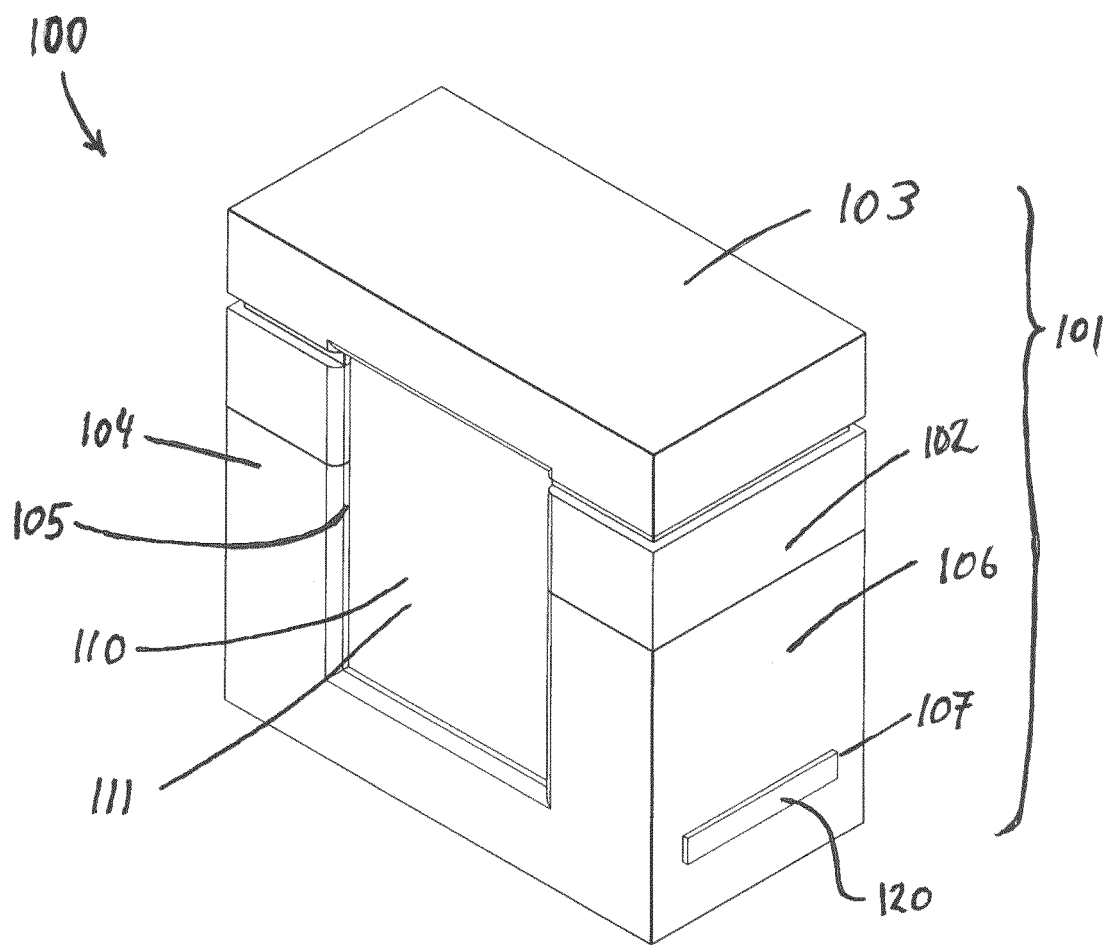
Fig. 4

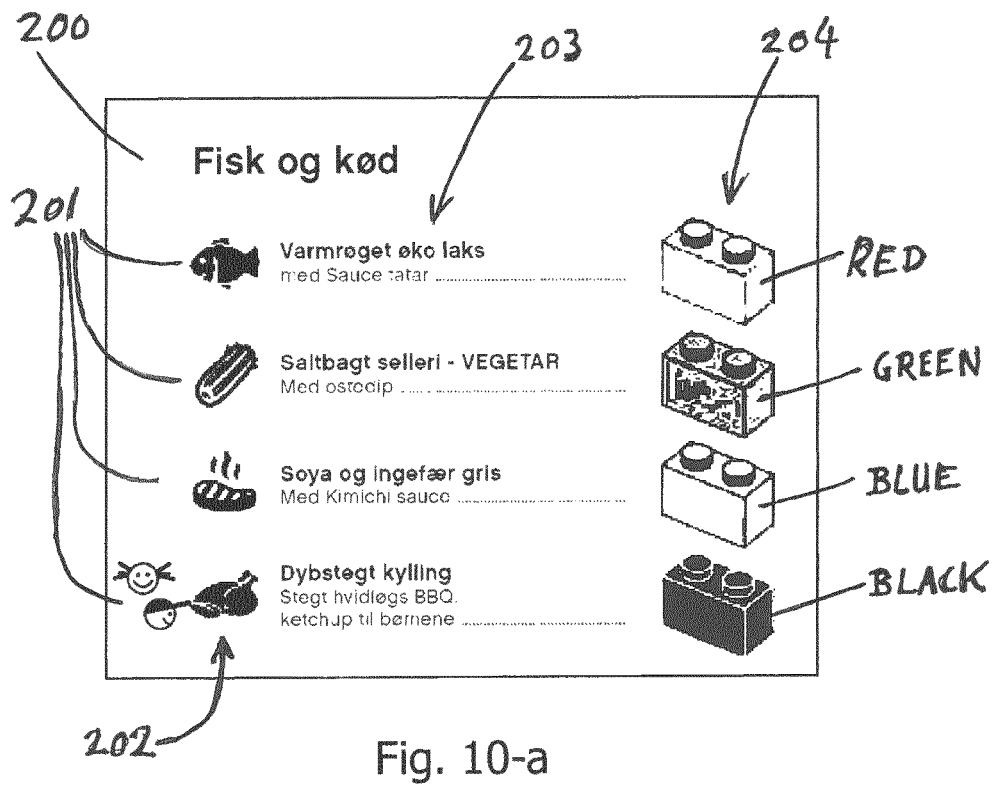
Fig. 10-a
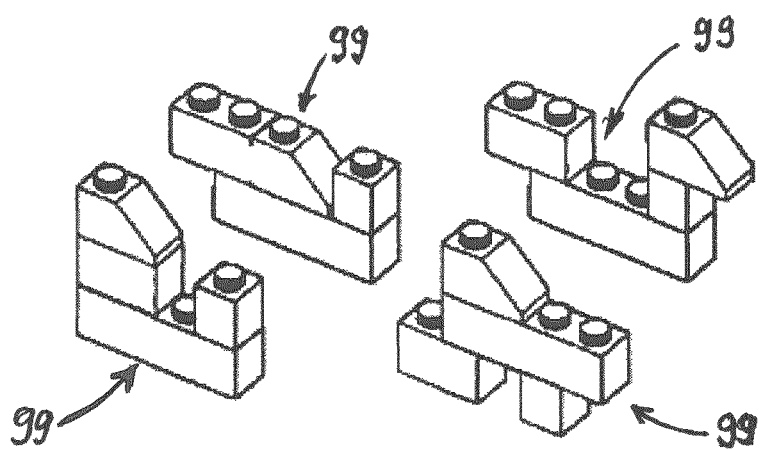
Fig. 10-b

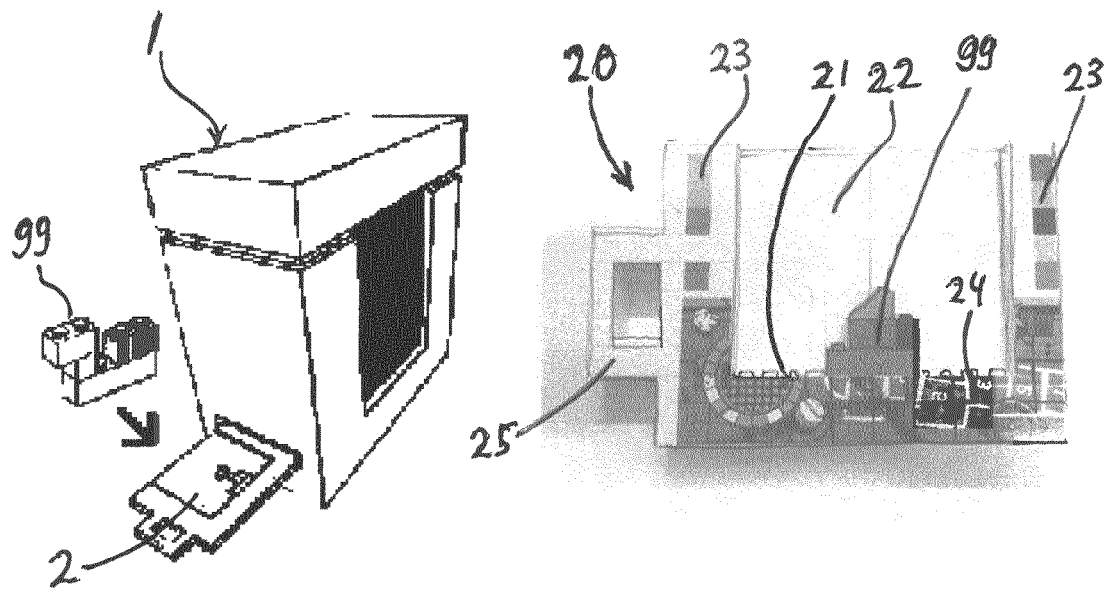
Fig. 10-c    Fig. 10-d
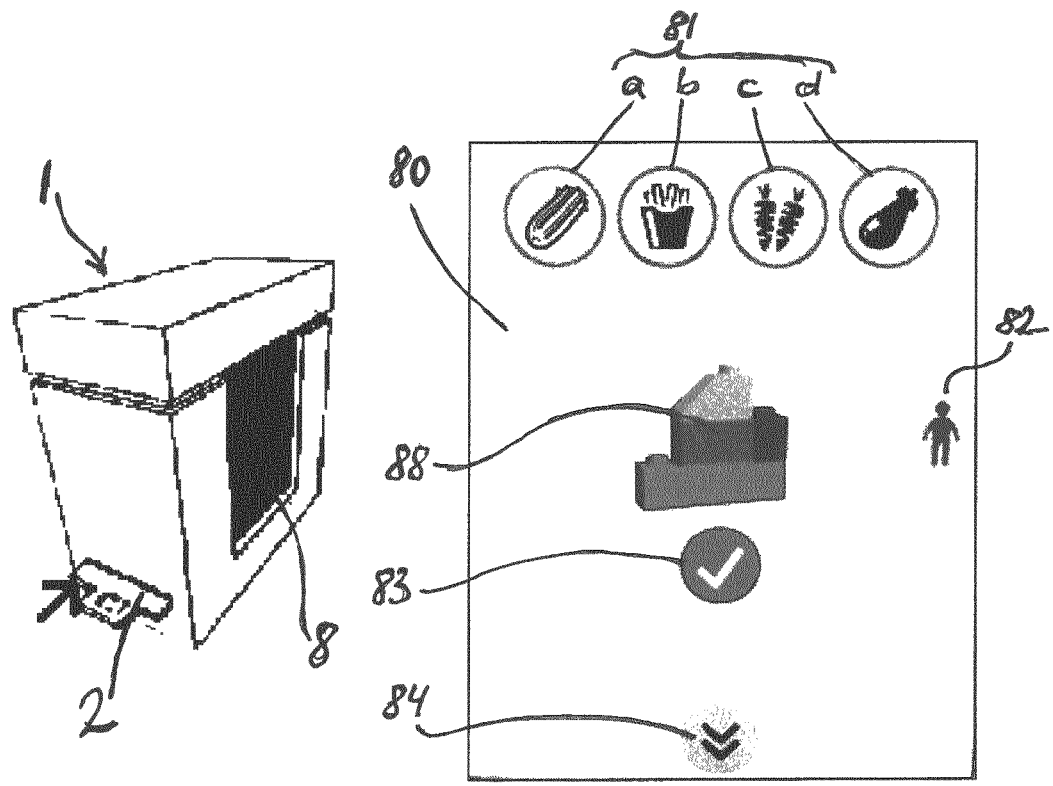
Fig. 10-e    Fig. 10-f

ELECTRONIC ORDERING SYSTEM AND METHOD

CROSS-REFERENCE TO RELATED APPLICATIONS

This application is a divisional application of and claims the benefit of priority to U.S. patent application Ser. No. 16/481,793, filed on Jul. 29, 2019, which is a U.S. National Stage of International Application No. PCT/EP2018/052788, filed on Feb. 5, 2018 and published on Aug. 9, 2018 as WO 2018/141956 A1, which claims the benefit of priority to Danish Patent Application No. DK PA201770070, filed on Feb. 6, 2017. The content of each of the above referenced patent applications is incorporated herein by reference in its entirety for any purpose whatsoever.

FIELD OF THE DISCLOSURE

In one aspect, the present disclosure relates to an electronic selection and ordering system and a method of selecting and ordering one or more deliverables. In a further aspect, the disclosure relates to a system and method of defining an order comprising a selection of one or more items selected from a choice of items. In a yet further aspect, the disclosure relates to an electronic system and method for determining a selection, defining and placing an order according to the selection. In a yet further aspect, the present disclosure relates to a system and method of producing one or more deliverables.

BACKGROUND OF THE DISCLOSURE

Online ordering systems and methods usually involve browsing a catalogue or structured lists of available items in an online-shop, and one by one adding a selection of items to a virtual shopping-cart, and finally submitting the order for fulfilment by the online-shop keeper. Electronic ordering systems are also known from restaurants, such as the ordering method and system for restaurants disclosed in the international patent application WO 2013/110942, which relates to methods and systems for ordering menu items for delivery to stations at premises, such as tables at restaurants.

While performing virtual shopping activities or placing orders by means of an electronic ordering system may be convenient and useful for an efficient handling of everyday dealings it is often difficult to attract the attention of certain user groups, for example children, that are less familiar or more reluctant to participate in procurement processes—in particular when it comes to commodities of a more practical nature, such as cloths or food. Furthermore, procurement may involve a selection and decision making process for configuring the deliverables, which may be complex to the unexperienced user.

Therefore there is a need for motivating the participation of these user groups, in particular children, in selection and ordering processes for all kinds of goods. According to one aspect, an object of the present disclosure is therefore to motivate the participation of certain reluctant user groups or unexperienced user groups, such as children, in procurement processes independent of the goods or services to be procured. According to a particular aspect, an object of the disclosure is to motivate the involvement of these user groups in the selection and decision making steps at the upstream end of the procurement process flow. According to a yet further aspect, an object of the disclosure is to train these user groups in selection and decision making steps for procurement and ordering configurable deliverables, thereby empowering these user groups to perform at least an essential part of such steps by themselves.

SUMMARY OF THE DISCLOSURE

The object of the disclosure is achieved by a system and method according to the embodiments disclosed in the appended claims as well as any further embodiments disclosed herein.

According to a broad aspect, the disclosure relates to a system for defining an order for ordering one or more deliverables from a supplier of products or services, the system comprising a plurality of toy construction elements, each comprising one or more coupling members configured for releasably interconnecting the toy construction elements with each other; a scanning device operable to capture a digital representation of a toy construction model constructed from one or more of said toy construction elements; and a processor configured to determine, from the digital representation, one or more attribute parameters, each indicative of a respective attribute derivable from one or more toy construction elements in the toy construction model; wherein the processor is further configured to determine, based on the determined one or more attribute parameters, a selection of one or more items selected from a choice of items, wherein the selection defines one or more deliverables of the order.

More particular, a first aspect of the disclosure relates to an electronic selection and ordering system, the system comprising: an apparatus for defining one or more deliverables, the apparatus comprising a plurality of toy construction elements, each toy construction element comprising one or more coupling members configured for releasably interconnecting the toy construction elements with each other; a scanning device operable to capture a digital representation of a toy construction model constructed from one or more of said toy construction elements; and a processor configured to determine, from the digital representation, one or more attribute parameters, each indicative of a respective attribute derivable from one or more toy construction elements in the toy construction model; wherein the processor is further configured to determine, based on the determined one or more attribute parameters, a selection of one or more items selected from a choice of items, wherein the selection of items provides a definition of the one or more deliverables; and transmission means, adapted to pass the definition to a production facility such as a transmitter configured to transmit the definition via a network to a receiver. The production facility is adapted for producing and configuring the one or more deliverables in agreement with the definition, thus allowing for proper fulfilment of the order.

The system includes a physical user interface, where a user can physically interact with the system by picking one or more toy construction elements, building a toy construction model from the one or more toy construction elements and placing the toy construction model for scanning by the scanning device. The scanning device is a device adapted to interact with the toy construction model in any suitable manner to probe the toy construction model and create a digital representation thereof, such as by optical, mechanical and/or electronic interaction. The digital representation is to include information on at least one or more attribute parameters, each indicative of a respective attribute derivable from one or more toy construction elements in the toy construction model. Advantageously, the digital representation comprises information identifying the one or more toy construction elements from which the toy construction model is constructed. Further advantageously, the digital representation comprises information identifying the relation of different toy construction elements in the toy construction model with respect to each other.

The system further comprises a data processing portion including the processor, which is configured to receive the digital representation of the scanned toy construction model. The digital representation is used to determine specific values for the attribute parameters associated with attributes derivable from one or more toy construction elements in the toy construction model presented by the user. Determining specific values for the attribute parameters may include one or more of analyzing the digital representation of the toy construction model with respect to attributes, identifying relevant attribute parameters for these attributes, and deriving specific values found for the identified attribute parameters in the digital representation of the specific toy construction model that has been scanned. Based on the specific values, a selection of items from a choice of items is determined in agreement with a deterministic set of rules. The processing unit then produces an output specifying the specific selection of items made according to the specific toy construction model presented at the scanning device and defines one or more deliverables of the order based on the selection.

The items that can be selected from the choice of items are unequivocally linked to deliverables. Most preferably, different distinguishable toy construction elements are connected to respective items of the choice of items. Further preferably, the user is provided with this information beforehand, i.e. the user is aware of the connection between toy construction elements and the items when constructing the toy construction model. This allows for a purposive construction. The items may, for example, be a direct representation or description of the deliverables, just like an item on a menu card of a restaurant describes food that can be ordered. The items may, for example, also be conceived to be a representation or description of certain aspects of the deliverables, thus allowing for a specific configuration of a deliverable according to a particular combination of items found in the selection. A selection may define one or more deliverables of an order. The order may be directed to the requisition of only a single deliverable or a plurality of deliverables. The same order may be built from a plurality of selections stemming from a plurality of toy construction models captured by the scanning device sequentially and/or in parallel before concluding the order.

The deliverables are real world items, e.g. representing a group/number combination of physical products, a physical product, a physical product modification/customization option, or real world services that can all be ordered from a supplier according to the selection made. However, the deliverables are not conceived as a direct replication of the toy construction model or of the toy construction elements used in the toy construction model. The toy construction model is rather conceived as an abstract description of the selection that defines the deliverables of the order.

An important merit of the present disclosure is the insight that the interactive experience of an electronic selection and ordering system is significantly enhanced by including the playful handling of physical elements in the selection/ordering process, in particular if physical elements are used that are familiar to the user and that have a known 'fun factor' attached to them. A physical playing experience is thus linked to the process of selecting and ordering. The physical playing experience attracts and motivates users to participate in the procurement process in a way which is independent of the good to be procured. Thereby the users, and in particular children, are empowered in a playful way to make deliberate daily life decisions—also when it comes to commodities of a more practical nature, such as cloths or food. Furthermore, by using a plurality of tangible toy construction elements that can be interconnected with each other to construct a model, even more complex selections can easily be constructed in a much more comprehensible manner. Thereby the user's abstraction capabilities are trained.

Advantageously according to some embodiments, the data processing portion may further include a verification module adapted to checking for errors, e.g. if a selection output is at all possible, based on the data received as the digital representation of the toy construction model, or if the determined selection output can be considered allowable/plausible in regard to a given set of rules for allowable/plausible choices. The given set of rules may be predetermined or may be determined dynamically, e.g. in response to an identification input. This allows amongst others for a more stable operation of the system, for initiation of an error alert, for presentation of a request/suggestion for corrective action by the user, or for an automatic error correction.

The relevant attribute parameters include the attribute parameters required for determining a selection output according to a predetermined set of rules. Non-limiting examples for attributes may include shape, size, surface texture, colour, and number. Non-limiting examples for attribute parameters may include descriptives (with values such as "rectangular", "round", "red", and/or "rough"), type classifiers or toy construction element model numbers (with values such as "block", "flat tile", "other shape", "12345-XYZ"), numerical quantities and ranges (such as angles, curvatures, linear dimensions, area, volume), and combinations thereof. When a plurality of toy construction elements is used, the attributes may also include relations and locations of the toy construction elements in the toy construction model with respect to each other, where the associated attribute parameters may again include both descriptives and numerical quantities.

Advantageously according to some embodiments, the interaction includes optical interaction. This allows the user to establish a more intuitively understandable link from the perceivable physical characteristics of the toy construction elements and model to the physical characteristics probed by the scanning device, and thus to the digital representation generated by the scanning device. This makes it easier for the user to understand the link from the toy construction model to the selection made. Particularly advantageous are physical characteristics of the toy construction elements and model that can be perceived both visually and tactile. This allows for improved accessibility of the system also for visually impaired or blind users along with users of normal or near normal vision.

Advantageously according to some embodiments, the interaction includes electronic interaction, such as wireless communication with an electronic tag applied to or integrated in one or more of the toy construction elements. Such tags may include components for active and/or passive communication. Including electronic interaction, such as wireless communication, has the advantage that the toy construction elements in addition to their physical appearance can be electronically enhanced to include additional information. The interaction may include reading of tag data from the tag using any suitable technology and standard, such as RFID, Bluetooth, or NFC, or similar. According to some embodiments, the tag data may be rewritable, thereby allowing for a reconfiguration of the electronic attribute parameter of the electronically enhanced toy construction element. For example, the electronic attribute parameter may represent an additional gift, a surprise, a discount, only valid for a certain period in time and/or may be linked to identification information of the user. The electronically enhanced toy construction element may be handed out as a voucher, e.g. for a free meal or for tax free billing. The voucher may be electronically written when it is handed out e.g. in association with a uniquely identifiable mobile electronic device, such as an electronically tagged wrist band, a smart card, a telephone, a tablet, or a computer. Validity of the voucher may then be conditioned on the identification of the user with the uniquely identifiable mobile electronic device.

Advantageously according to some embodiments, the interaction includes mechanical interaction, such as by means of sensors for weight, force, acceleration, orientation, proximity, or touch sensors. Mechanical interactions may e.g. be advantageous for supplementing any of the above-mentioned interaction techniques, e.g. for the purpose of scaling or error checking. Mechanical interaction may further be helpful for providing an intuitive link to the physical characteristics of the toy construction elements and the model constructed from these, e.g. by mimicking aspects of the user's tactile handling thereof.

Further according to some embodiments of the system, the processor is configured to determine, from the digital representation, at least two or more attribute parameters, each indicative of a respective attribute derivable from one or more toy construction elements in the toy construction model. Accordingly, the selection is based on a combination of a plurality of attribute parameters, such as a combination of at least two attribute parameters. The plurality of attribute parameters may each be different attribute parameters of the same attribute, or may each be the same respective attribute parameter of different attributes. In case more than two attribute parameters are combined, a combination of both different attribute parameters of the same attribute and the same respective attribute parameters for different attributes may be conceived. The attributes may be derivable from one or more of the toy construction elements in the toy construction model. By requiring a combination of a plurality of attribute parameters for expressing the selection, a more flexible representation is achieved. This allows for expressing more selections with fewer toy construction elements. Thereby a more complex construction of the selection becomes possible, wherein the level of complexity depends on the number of attribute parameters that can be combined. The enhanced flexibility gives the designer of an embodiment of a system of the present disclosure more freedom of design for constructing selection rules for the specific context of the embodiment. For example, the designer may choose to use this freedom to improve the intuitive link between the attribute parameters and the available choices to enhance user experience. Alternatively or in addition thereto, the designer may also decide to use this freedom to adapt the level of complexity to a particular target user group, e.g. a particular age group of children, or in any other way to tailor an intended user experience.

Further according to some embodiments of the system, the toy construction model is constructed from at least two or more of said toy construction elements. By requiring a plurality of toy construction elements for constructing the toy construction model, a building experience is instigated. Thereby, the playful participation in the procurement process is promoted. Furthermore, by requiring a combination of a plurality of toy construction elements for expressing the selection, again a more flexible formulation is achieved. The enhanced flexibility gives the designer of an embodiment of a system of the present disclosure more freedom of design for constructing selection rules for the specific context of the embodiment. Also, a more complex construction of the selection becomes possible, wherein the level of complexity depends on the number of toy construction elements that can and/or have to be combined. In analogy to the examples mentioned above, the designer may choose to use this freedom to improve the intuitive link between the attribute parameters and the available choices to enhance user experience. Alternatively or in addition thereto, the designer may also decide to use this freedom to adapt the level of complexity to a particular target user group, e.g. a particular age group of children, or in any other way to tailor an intended user experience. A particular advantage of requiring multiple toy construction elements is that the considerations of deliberate decision making are made concrete by the physical interaction when constructing the toy construction model from the plurality of toy construction elements. Most preferably, the selection is based on a combination of attribute parameters from a plurality of toy construction elements, thereby motivating the constructive nature of the selection process as a combination of plural configuration decisions. However, it is also conceivable that some toy construction elements do not have attributes that are directly relevant for the selection. Thereby, the concepts of relevance and redundancy in respect of the decision making process is supported, where relevant toy construction elements may have an impact on the selection, while redundant toy construction elements do not. Nevertheless, the user may choose to include such redundant toy construction elements in the toy construction model, e.g. for decorative purposes for creating a more attractive toy construction model for the same selection. It is also conceivable that toy construction elements that at the face of it are redundant may be used as separators. Toy construction elements that are redundant per se may thus come to play a role for the interpretation of the toy construction model as a selection of items when the toy construction model is considered in its entirety.

Further according to some embodiments of the system, the scanning device is an image capturing device operable to capture one or more images of the toy construction model; wherein the processor is configured to determine, from the captured one or more images, one or more visual attribute parameters, each indicative of a respective visual attribute derivable from one or more of a colour, a shape, a size, a location and a number of one or more toy construction elements in the toy construction model; and wherein the processor is further configured to determine the selection of one or more items based on the determined one or more visual attribute parameters.

The term 'visual' as used herein is understood as 'perceivable by optical means', i.e. means that are at least partially sensitive to electromagnetic radiation in the visual range of the electromagnetic spectrum, such as radiation having wavelengths between 400 nm and 780 nm. This allows for integrating a direct visualization of the ordering process into the user experience design of systems according to these embodiments. For example, the formulation of the selection process may thereby be made visually intuitive.

Advantageously according to some embodiments, the visually detectable attributes are reproduced in instructions illustrating the choice of items. For example, a depiction of a particular toy construction model may be presented next to a product in an exhibition, or next to a graphical illustration and/or textual description of a product or service that can be ordered. The depiction may be a true or schematic picture of the toy construction model or a schematic picture, and may be e.g. in the form of a printed display or shown on an electronic display. The electronic display may be located in an exhibition next to the physical product or next to the graphical illustration or textual description of the product or service. The electronic display may be part of the system. The user may have to find the required toy construction elements at different locations or in a pool of available toy construction elements, thereby adding a chase for resources to the user experience associated with the procurement process. The electronic display may also be a display on a mobile device, such as a tablet computer or a smartphone. Furthermore, the depiction of the toy construction element may be revealed only upon scanning of a code or may appear on the electronic display upon a trigger event. The trigger event may be linked to detection of the product or of a purchase information display, e.g. by proximity detection, code reading, or image recognition using a mobile device held by the user. Alternatively or in addition thereto the trigger event may also be activated depending on a location of the user, and/or depending on the location and/or orientation of a mobile device held by the user. By all these means, a gamification of the procurement process may be implemented, thus enhancing the user experience and motiving the participation of the target user groups.

Advantageously according to some embodiments, attributes of the toy construction elements that are at least perceivable by tactile means are taken into account for defining the selection. Such embodiments are particularly useful for the visually impaired, in low light conditions, and/or for the purpose of playing experiences directed to tactile sensing. Tactile attributes may be used to express additional information than by any of the visual attributes; the tactile attributes may support any information expressed by visual attributes, and/or correspondingly replace visual attributes such that the both visual attributes and the corresponding tactile attributes are used to express the same information. In the same way, tactile attribute parameters may express additional or supporting information, or may directly translate into visual attribute parameters. Further advantageously according to some embodiments, visual attributes of the toy construction elements that are also perceivable by tactile means, such as shape, size and/or surface texture, are taken into account for defining the selection, disregarding attributes that are only optically perceivable, such as colour, transparency, or translucency. Such embodiments are particularly advantageous for use in a context where visual attributes (or attribute parameters) directly translate into non-visual attributes (or attribute parameters).

Further according to some embodiments of the system, the selection comprises customization information for customizing at least one of the selected items. The experience attached to shaping one's own, personal creation further enhances the fun factor of the interactive experience, and thereby motivates children using the system (or the playful grown-up user) to participate in the procurement process. By participating the user undergoes a playful learning experience, eventually leading to enhanced empowerment of the user.

Further according to some embodiments of the system, the customization information is based on at least one of the determined one or more attribute parameters. Thereby the customization experience of shaping one's own product is closely linked to the interactive experience of building and handling the toy construction elements to form of a toy construction model reflecting a personal touch to the product. By coupling a customization experience to the handling, combination and assembly of the physical items in the selection and/or ordering process, the fun factor attached to the interactive experience is further enhanced.

Further according to some embodiments of the system, the system further comprises a display device. Preferably the display device is a graphical display. Thereby, interactive information can be presented to the user, such as a set of rules and/or guide for building a toy construction model so as to represent a particular selection of items from the choice of items.

Further according to some embodiments of the system, the display device is configured to display a graphical representation of the toy construction model. This allows the user to visually follow the digitization process, and to more easily understand the link from the toy construction model to the selection made, and eventually to the deliverable defined thereby.

Advantageously according to some embodiments, the digital representation contains information on the three-dimensional nature of the toy construction elements and/or on the three-dimensional nature of the toy-construction model. Alternatively or in addition thereto, information on the three-dimensional nature of the toy construction elements and/or model are developed from the digital representation thereof, e.g. from images captured by an image capturing scanning device. A suitable technique for capturing and developing a virtual three-dimensional representation from a toy construction model is, for example, disclosed and described in detail in the international patent application WO 2015/185629 A2. Thereby it is achieved that the toy construction model may be shown on a graphical display as a three-dimensional (3D) graphical representation.

Advantageously according to some embodiments the graphical representation of the toy construction model is a three-dimensional (3D) graphical representation. This allows for the integration of the toy construction model in e.g. a vivid and playful animation of the process of receiving and processing an order. Most of all, by dynamically integrating the user's toy construction model into an animation telling a story about receiving, interpreting, and processing not just any order, but the user's order further enhances the interactive involvement in the procurement process. Furthermore, by integrating a 3D graphical representation of the user's toy construction model in such an animation, the actual status of the order may also be communicated. By including such useful user-specific information, the user's attention is further attracted, thus further enhancing the involvement of the user in the procurement process in an entertaining manner.

Advantageously, the 3D-representation of the toy construction model includes one or more individual 3D-representations of one or more of the toy construction elements in the toy construction model. The individual representations of the toy construction models may be directly contained in the captured digital representation of the toy construction model or may be developed on the basis thereof. Thereby, an animation of the analysis and translation of the toy construction model shaped by the user into a selection of items, and further into a number of deliverables becomes possible. For example, a 3D graphical representation of the toy construction model may be disintegrated in a virtual space to extract one or more 3D graphical representations of the toy construction elements forming the model, e.g. for the purpose of further animating/illustrating the analysis and translation of the toy construction model into deliverables, and the subsequent production of the deliverables.

Further according to some embodiments of the system, the display device is configured to display the selection of one or more items. Thereby, a direct feedback to the user may be given, showing the selection of items made by means of the toy construction model the user has built and digitized.

Advantageously according to some embodiments of the system, the display device is configured to display the graphical representation of the toy construction model along with the selection of one or more items on the display device so as to allow for a visual verification of the selection. Thereby the selection is easily verified and an improved understanding of the link between the toy construction model and the selection made is facilitated.

Further according to some embodiments of the system, the display device is configured to display a representation of one or more deliverables defined by the toy construction model. Thereby it is possible to verify correctness of the order.

Further according to some embodiments of the system, the order further comprises identification information. By retrieving unique identification information and including said unique identification in the order, correct fulfilment of the order is facilitated. e.g. relating to fulfilment of the order at the correct location, to the correct user, and/or regarding payment.

Further according to some embodiments of the system, the identification information is one or more of a user identification, a location of order submission, a location of order fulfilment, a location of delivery, and payment related information. Thereby correct handling of the order is facilitated in relation to fulfilment to the correct user, in relation to fulfilment at the correct location, and/or regarding payment.

Further according to some embodiments of the system, the system further comprises a transmitter configured to transmit the order. This allows to submit the order to a supplier, e.g. via a network to a receiver at an order handling unit, which may pass the order to a production facility Further according to some embodiments of the system, the processor is further configured to receive confirmation input and to make the transmission of the order conditional on the confirmation input. This further improves order handling avoiding the submission of wrong orders. This is particularly useful in the context of the present disclosure, where unexperienced users are to be involved in the ordering procurement process. Furthermore, the ordering process itself may include more degrees of freedom for reasons of adding a physical experience to the selection process as given above. A confirmation prior to submission allows for verification of the deliverables defined.

Further according to some embodiments of the system, the deliverables are food/drink products. Thereby, a selection of food/drink related items from a menu is determined, which defines food/drink products as the deliverables. In particular, the system is advantageously adapted for ordering food and/or drinks in a restaurant, such as ordering meals that are selectable from a menu according to a legend showing the choice of items and the toy construction elements required to select and combine these items.

Further according to some embodiments of the system, the deliverables are retail products, such as toy construction sets, clothing, home textiles, luggage, furniture, electronic devices, or similar merchandise. Thereby, a selection of e.g. non-food related products may be determined, which defines corresponding non-food deliverables. The process of physically building the order from toy construction elements allows for a highly flexible configuration of the retail product deliverables in an intuitive way, e.g. for the purpose of customization or personalization.

Further according to one aspect, a system for producing a configurable deliverable comprises: an electronic selection and ordering system according to any one of the embodiments disclosed herein; a production facility; and a receiver adapted to receive a definition of a deliverable from the electronic selection and ordering system and to pass the definition to the production facility. The production facility is adapted for producing the one or more deliverables in agreement with the definition, thus allowing for proper fulfilment of the order of the deliverables as defined by the user.

A second aspect of the disclosure relates to a method of selecting and ordering one or more deliverables, the method comprising: providing a toy construction model constructed from one or more toy construction elements, each toy construction element comprising coupling members configured for releasably interconnecting the toy construction elements with each other; scanning the toy construction model to obtain a digital representation of the toy construction model; determining, from the digital representation, one or more attribute parameters, each indicative of a respective attribute derivable from one or more toy construction elements in the toy construction model; determining, based on the determined one or more attribute parameters, a selection of one or more items selected from a choice of items; providing a definition of the one or more deliverables based on the determined selection; and transmitting the definition to a production facility. Advantageously, the method may further comprise producing the one or more deliverables in agreement with the definition, thus allowing for fulfilment of the order of the deliverables as defined by the user. Furthermore, according to a broader aspect, the disclosure also relates to a method of defining an order for ordering one or more deliverables from a supplier of products or services, the method comprising: receiving a digital representation of a toy construction model constructed from one or more toy construction elements, each comprising coupling members configured for releasably interconnecting the toy construction elements with each other; determining, from the digital representation, one or more attribute parameters, each indicative of a respective attribute derivable from one or more toy construction elements in the toy construction model; determining, based on the determined one or more attribute parameters, a selection of one or more items selected from a choice of items; and defining one or more deliverables of the order based on the determined selection. The method preferably includes steps of a computer-implemented method. Advantageously according to some embodiments, the attributes are derivable from one or more of a color, a shape, a size and a number of one or more toy construction elements in the toy construction model. By the implementation of the method, analogue advantages are achieved as discussed in detail above with respect to the system for defining an order for ordering one or more deliverables from a supplier of products or services and the system for selecting and ordering one or more deliverables. Corresponding advantages are also achieved by the advantageous embodiments defined by the dependent claims and recited below.

Further according to some embodiments of the method, determining one or more attribute parameters includes determining one or more visual attribute parameters, each of the visual attribute parameters being indicative of a respective visual attribute derivable from one or more toy construction elements in the toy construction model. By way of example, the attributes may be one or more of a colour, a shape, a size and a number. Advantageously according to some embodiments, determining the selection of one or more items is based on one or more attribute parameters including the one or more visual attribute parameters.

Further according to some embodiments of the method, the order further comprises identification information. The order thus comprises at least an indication of a deliverable as defined by the selection of one or more menu items selected from a choice of menu items and identification information, wherein the deliverable is defined by the method according to any one of the embodiments as derivable from the present disclosure. Advantageously according to some embodiments, the method further comprises receiving/retrieving identification information.

Further according to some embodiments of the method, the identification information is one or more of a user identification, a location of order submission, a location of order fulfilment, a location of delivery, and billing/payment related information. Advantageously according to some embodiments, the identification information is user identification information, such as retrieved by means of an electronic ID reader device, such as an RFID tag reader, a magnetic reader device, an optical ID reader device. It is also conceivable that the identification information is based on biometric information of the user, thus making the use of a separate ID-tag superfluous. Advantageously according to some embodiments a location of order submission, fulfilment, or delivery is retrieved automatically. e.g. based on dynamically obtained global positioning data or based on location data stored in a device used for implementing the method. Billing and/or payment related information may advantageously be linked to unique user identification, e.g. in via a user account, and/or may be retrieved via an electronic payment terminal or an equivalent electronic payment method.

Further according to one aspect of the disclosure, a data processing system comprises computer program code configured to cause, when the computer program code is executed by the data processing system, the data processing system to perform the steps of the method as defined herein.

Further according to one aspect of the disclosure, a computer program product comprises computer program code configured to cause, when executed by a data processing system, the data processing system to perform the steps of the method as defined herein.

Further according to one aspect of the disclosure, a scan unit for use, in particular for use as a user terminal, in a system or method according to any of the preceding claims is provided, the scan unit comprising: a housing; a scanning device arranged in the housing, wherein the scanning device is operable to capture a digital representation of a toy construction model constructed from one or more toy construction elements, each toy construction element comprising one or more coupling members configured for releasably interconnecting the toy construction elements with each other; and a drawer that is insertable into the housing, wherein the drawer is adapted to receive a toy construction model on a support surface so as to position said toy construction model for scanning by the scanning device when the drawer is in an 'INSERTED' position in the housing. Most preferably, the scan unit further comprises a plurality of toy construction elements, each toy construction element comprising coupling members configured for releasably interconnecting the toy construction elements with each other. The toy construction elements are for constructing a toy construction model representing the user's selection as discussed herein.

The scan unit is for use in a system or method according to any of the embodiments disclosed herein. The scan unit is adapted to defining an order for ordering one or more deliverables from a supplier of products or services based on the scanning of a toy construction model built by a user and presented as an input. The drawer is for positioning the toy construction model to be captured with respect to the scanning device, preferably in a well-defined position, but at least such that the scanning device can capture the toy construction model and generate a suitable digital representation as an output. The digital representation has to be suitable as an input to a processor for determining one or more attribute parameters, each indicative of a respective attribute derivable from one or more toy construction elements in the toy construction model, and for subsequently determining, based on the determined one or more attribute parameters, a selection of one or more items selected from a choice of items, wherein the selection of items defines one or more deliverables of the order.

Further according to some embodiments of the scan unit, the scanning device comprises a camera adapted to capture one or more images of a toy construction model placed on the support surface of the drawer. Thereby a scan unit is suited for acquiring visual attributes derivable from the toy construction elements of the toy construction model.

Further according to some embodiments, the scan unit further comprises beam deflecting optics, such as mirror optics, the beam deflecting optics being adapted to project an image of the toy construction model into the field of view of the camera. Thereby a more flexible configuration of the geometry of the arrangement of the camera in the housing with respect to the drawer is achieved.

Further according to some embodiments, the scan unit further comprises an illumination device adapted to illuminate the toy construction model during image capture. Thereby a well-defined illumination may be provided allowing for reliable image capture. Furthermore, the illumination may be particularly adapted for reliable colour recognition from the captured images of the toy construction models and the toy construction elements forming it. Further advantageously, the image capture is performed in a closed housing, only using the built-in illumination source for the image capture, so as to eliminate any interference from ambient light.

Further according to some embodiments of the scan unit, the support surface of the drawer comprises one or more coupling members configured for releasably interconnecting the toy construction model with the support surface. Thereby, the drawer is adapted to position the toy construction model in a fixed position with respect to the scanning device when the drawer is inserted in the housing. This is particularly advantageous for image capture by allowing for a well-defined orientation and imaging geometry, thereby simplifying the image capture, reducing the complexity of the required image analysis for deriving any visual attributes, and improving the reproducibility of the image capturing process. This eventually also improves the predictability of the process of determining visual attribute parameters and provides improved operational stability to the scan unit and to any system or method using the scan unit.

Further according to some embodiments, the scan unit further comprises a trigger switch adapted for triggering the scanning device to perform a capture, wherein the trigger switch is arranged to be activated when the drawer is the 'INSERTED' position. The scanning device is operable to perform a capture in order to generate a digital representation of a toy construction model placed on the drawer. To perform the capturing step, the user places a toy construction model on the drawer when it is in its retracted position, i.e. when the drawer is withdrawn from the housing such that the support surface is accessible from the outside of the housing. The toy construction model is then inserted into the scan unit by sliding the drawer in place into the 'INSERTED' position, thereby activating the trigger switch, which in turn automatically triggers a capture to be performed by the scanning device. Advantageously, when the capture additional requires illumination, the trigger switch may also activate any built-in illumination accordingly.

Further according to some embodiments of the scan unit, the scanning device is a tablet computer. Using a tablet computer readily provides at the same time a scanning device, a processor, a display, and may further provide an interactive input interface, e.g. in the form of a touch screen. Preferably the tablet computer is arranged in a side wall of the housing such that a rear-facing camera of the tablet computer faces inward, i.e. into the housing, and a display of the tablet computer faces outward, i.e. out of the housing, such that the display of the tablet computer is visible (and accessible) from the outside of the housing. Herein, the term 'rear-facing camera' refers to a camera of the tablet computer or other portable device that has the lens facing away from its display. Advantageously, the housing may further comprise a battery pack or similar autonomous power supply adapted to provide back-up power to the scanning device, e.g. the tablet computer, and/or any additional illumination.

Further according to some embodiments of the scan unit, the housing is provided with one or more guide elements, such as a guide rail, for positioning the tablet computer in the housing. The guide elements are shaped and dimensioned for easy and precise positioning of the tablet computer in the housing when placing or replacing the tablet computer, in particular for easy and correct repositioning of the tablet computer after removal. Advantageously according to some embodiments, the guide elements comprise one or more guide rails adapted to engage edges of the tablet computer so as to allow for sliding the tablet computer in place and hold it in a fixed position with respect to the housing. The tablet computer may thus easily be removed from the housing again for recharging, replacement, or any service and repair tasks. The one or more guide elements are preferably arranged along the edge(s) of a window or opening in a side wall of the housing, the window or opening providing access to the outwardly facing display of the tablet computer, when the tablet computer is inserted in the housing.

Further according to some embodiments of the scan unit, the scan unit further comprises an identification information reader. The identification information reader is for reading user identification information from an identification carrier, such as a tag or a mobile device. The identification information reader may be employ any suitable communication means, preferably wireless, such as an RFID scanner, a nearfield scanner, a magnetic scanner, or similar. The identification information reader may also be conceived to work with device-less identification, such as identification based on biometric information.

BRIEF DESCRIPTION OF THE DRAWINGS

FIGS. 1-3 each show prior art toy construction elements.
FIGS. 4-8 show different views of a scan unit according to one embodiment.
FIGS. 10-a through 10-f illustrate a method for defining an order according to one embodiment.

DETAILED DESCRIPTION

Figure 5:
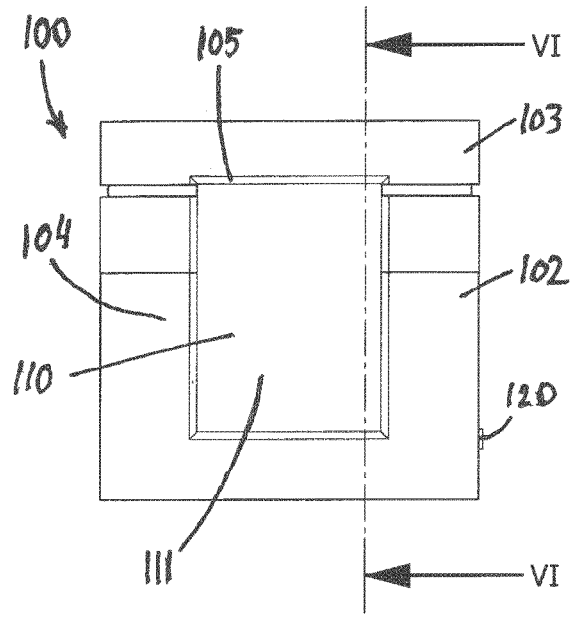

Various aspects and embodiments of toy construction systems disclosed herein will now be described with reference to toy construction elements in the form of bricks. However, the disclosure may be applied to other forms of construction elements for use in toy construction sets.

FIG. 1 shows a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005, 282. FIGS. 2 and 3 show other such prior art construction elements. The construction elements shown in the remaining Figures have this known type of coupling members in the form of cooperating studs and cavities. However, other types of coupling members may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of coupling members at coupling locations defining a regular planar grid allow the toy construction elements to be interconnected in a discrete number of positions and orientations relative two each other, in particular at right angles with respect to each other.

Referring to FIGS. 4-8 in the following, a scan unit 100 according to one embodiment is described, which is adapted to be operable as a system for defining an order for ordering one or more deliverables from a supplier of products or services.

FIG. 4 shows a perspective view of the scan unit 100 according to one embodiment. The scan unit 100 has a housing 101 with a bottom portion 102 and a top portion 103. The top portion 103 can be removed from the bottom portion 102, thereby yielding access to the inside of the housing 101. A front wall 104 of the housing 101 has a window opening 105 framing a front-facing display 111 of a tablet computer 110. A side wall 106 of the housing 101 has an opening 107 adapted for the insertion of a drawer 120. An example of a suitable drawer and its insertion into the scan unit is also illustrated in FIGS. 10-c through 10-e further discussed below. In the embodiment shown here, the housing is rectangular block shaped to scale and with surface details mimicking the appearance of the above-mentioned prior art toy construction elements. However, it is noted that other shapes and decorative modifications of the outer shell may be conceived by the skilled person to work in an equivalent manner, i.e. without deviating from the disclosure.

FIG. 5 is a front elevation of the scan unit 100, i.e. with the display 11 of the tablet computer 110 facing out of the drawing plane towards the observer. The display 111 is accessible by a user from the outside of the housing 101 through the opening 105 in the front wall 104.

Figure 6:
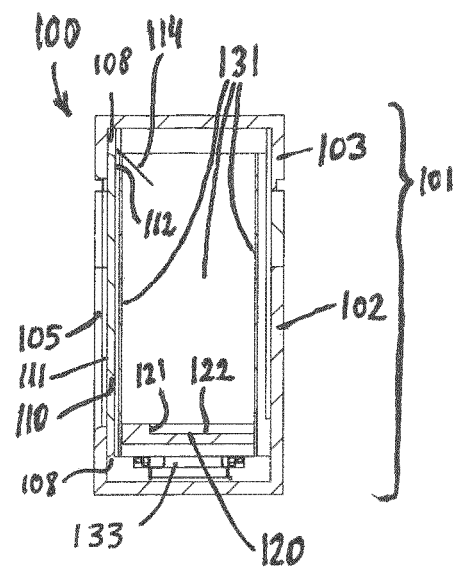
Figure 8:
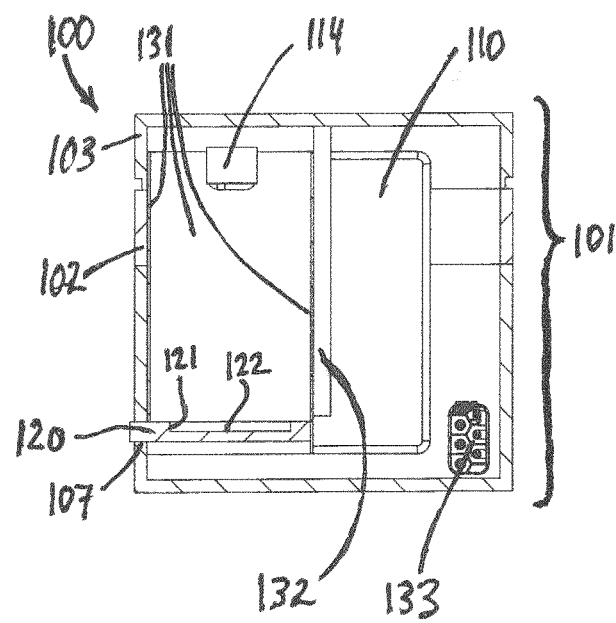

FIG. 6 shows a cross-sectional view of the scan unit as cut along line VI-VI in FIG. 5. A tablet computer 110 is arranged flush to the front wall 104 of the housing 101 on the inside thereof. The front-facing display 111 of the tablet computer 110 is aligned with the opening 105 in the front wall 104, facing in an outward direction with respect to the housing 101. The tablet computer 110 has a rear-facing camera 112 pointing in a direction away from the front-facing display, towards the inside of the housing 101. A mirror 114 redirects the field of view of the front facing camera 112 towards the bottom of the housing 101. At the bottom of the housing 101 a drawer 120 is seen in an 'INSERTED' position with support surfaces 121, 122 facing upwardly towards the inside of the housing 101. The drawer 120 is adapted to receive a toy construction model on the support surfaces 121, 122 so as to position said toy construction model for scanning by the camera 112 when the drawer 120 is in the 'INSERTED' position in the housing 101. In particular the vertical support surface 121, i.e. the support surface facing in a horizontal direction, is advantageously configured as an attachment surface having coupling means allowing for the releasable interconnection of a toy construction model with the attachment surface 121. Thereby, a well-defined and reproducible positioning of the toy construction model with respect to the image capturing path is achieved. The rear-facing camera 112 of the tablet computer 110 is thus adapted to capture, via the mirror 114, images of a toy construction model when this is arranged on the drawer in its 'INSERTED' position. Inside the housing, a diffusive illumination arrangement is provided for properly illuminating the scene on the drawer, thereby facilitating a well-defined and reproducible image capture allowing for a reliable interpretation of the digital representation obtained by the image capturing stage of the system. The diffusive lighting system in the embodiment shown here comprises backlit diffuser plates 131, such as plates made from an opal white translucent acrylic material, which are illuminated using a white light source. Here, backlighting of the diffuser plates 131 is provided by LED lighting elements 132. Preferably, the LED lighting elements 132 have a colour rendering index of at least 80. The LED lighting elements 132 may be powered from a battery 133 as best seen in FIG. 8. Thereby it is achieved that the scan unit is autonomous in terms of its power supply, thereby largely simplifying installation and the flexibility for placing or moving the scan unit around when designing e.g. a show room or a restaurant for using scan units of a system for defining an order as disclosed herein.

The tablet computer 110 is held in place in the housing by guide elements formed as guide rails 108. When the top portion 103 is removed, the guide elements 108 allow for sliding the tablet computer 110 out of and back into the correctly aligned position vis-à-vis the opening 105 (and with respect to the optical path for image capture). This facilitates replacement and repair tasks to be performed on the tablet computer 110, yet fixing the tablet computer 110 and holding it reproducibly in a correct position with respect to the housing 101.

Figure 7:
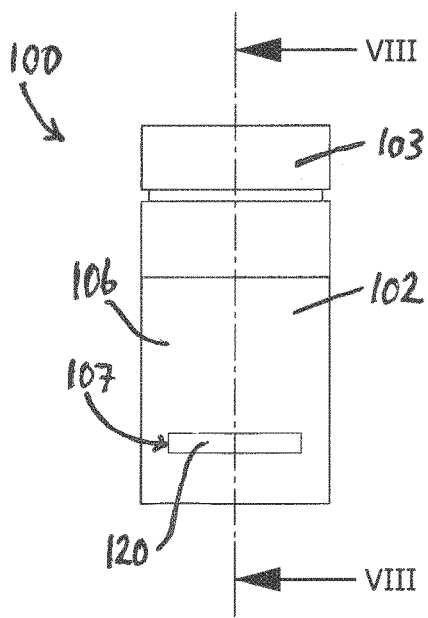

Further views of the scan unit 100 are given in FIGS. 7 and 8. FIG. 7 shows a side elevation looking at the side wall 106 with the opening 107 for the drawer 120, and FIG. 8 shows a cross-sectional view cut along line VIII-VIII in FIG. 7. In particular, FIG. 8 shows the rear side of the tablet computer 110, the mirror 114 adapted to project an image of the drawer 120 into the field of view of the rear-facing camera 112 of the tablet computer 110, the inserted drawer 120, and diffusive lighting 131, 132 for illuminating the scene on the drawer surface at least during the image capture process. As mentioned above, a battery pack 133 is adapted to supply the lighting elements 132, and optionally also the tablet computer 110, thereby making the scan unit 100 autonomous.

The rear-facing camera 112 of the tablet computer 110 can thus be operated as a scanning device (arranged in the housing) to capture a digital representation of a toy construction model constructed from one or more toy construction elements. The tablet computer 110 further comprises a processor that is configured for receiving the digital representation of the toy construction model; determining one or more attribute parameters from the digital representation, each indicative of a respective attribute derivable from one or more toy construction elements in the toy construction model, and determining a selection of one or more items selected from a choice of items, based on the determined one or more attribute parameters, wherein the selection of items defines one or more deliverables of an order to be placed with a supplier. The scan unit may as such be operated as a system for defining an order for ordering products and/or services from a supplier, such as for ordering food from a menu in a restaurant. The tablet computer 110 is further provided with communication means, such as wireless communication means allowing for sending the order to the supplier. When the supplier receives the order, the supplier, if necessary, acknowledges/confirms the order, and fulfils the order by delivering the products and/or services as determined from the user's toy construction model using the scan unit 100.

Figure 9:
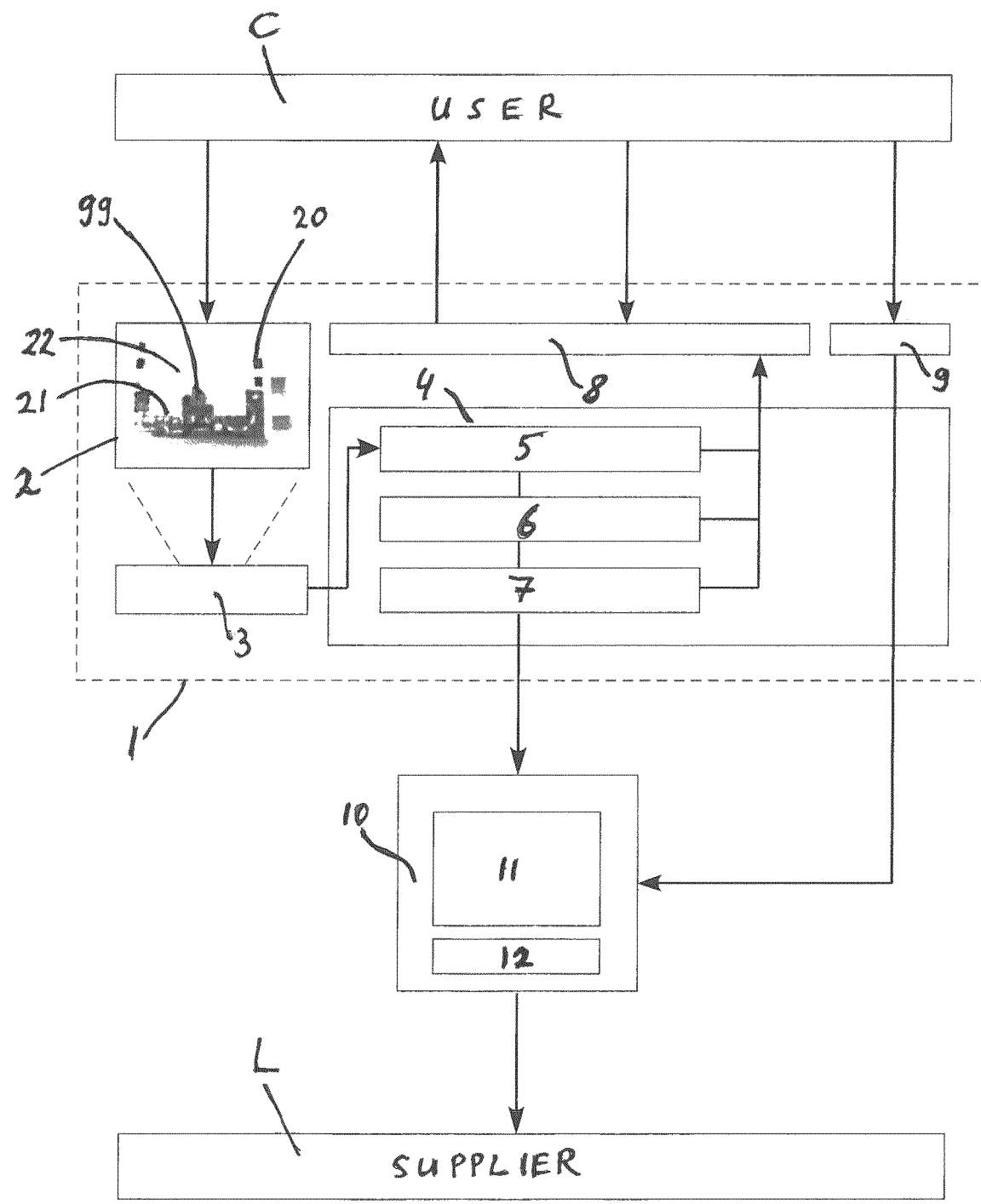
FIG. 9 shows diagrammatically a system for defining an order according to one embodiment.

FIG. 9 shows a diagrammatic representation of a system 1 and its operation for defining an order for ordering one or more deliverables from a supplier of products or services. A user 'C' constructs a toy construction model 99 from a plurality of toy construction elements according to a set of rules provided at the system 1. The set of rules connects one or more of the toy construction elements to items in a choice of items. The user C then places the toy construction model 99 in or on a scanning port 2, such as a drawer 20 with support surfaces 21, 22, for scanning by a scanning device 3. The scanning device 3 captures a digital representation of the toy construction model 99 and passes the digital representation on to the processor 4 for analysis by an attribute analysis engine 5 in respect of certain attributes derivable from the one or more toy construction elements in the toy construction model 99, in particular in respect of relevant attribute parameters. Relevant attribute parameters are those attribute parameters that are used by the system 1 to allow for unique distinction of the selection made in respect of the set of rules to which the system 1 has been configured. The processor further comprises an interpretation engine 6, which interprets the determined one or more attribute parameters in terms of said set of rules to arrive at a selection. The selection is passed on to a definition engine 7 for defining one or more deliverables based on the selection of items determined by the interpretation engine 6. All stages of the process may be visualized on the display 8 such that the user C can follow the process of linking his/her toy construction model to a specific configuration selection with the purpose of defining a deliverable, thereby illustrating the deliberate decision making in a playful and intuitive way. The display 8 may further comprise a user input interface, such as a touch screen, a keyboard, and/or simple navigation buttons in order to allow for user input, e.g. for modification, confirmation and/or submission of the specified order using the system 1. Optionally, the system may include an identification reader device 9 adapted to retrieving unique identification information. For example, the identification information may be one or more of a user identification, a location of order submission, a location of order fulfilment, a location of delivery, and payment related information. The system then outputs an order specification 10 including a list of one or more deliverables 11, and where applicable additional information 12, such as the unique identification information. The order specification may then be passed to a supplier 'L' for fulfilment.

The process of building a toy construction model, scanning the toy construction model, analysing a digital representation, interpreting the analysis result in respect of a set of rules, and defining deliverables may partially or entirely be repeated and/or nested as required in order to specify the order, before the order specification is sent to the supplier L.

The above-mentioned set of rules may e.g. be provided to the user as a menu or a catalogue, which may be in electronic form, e.g. presented on the display 8 of the system 1, or which may be displayed in printed form. It is also conceivable that the user C is aware of at least some of the rules beforehand, such as a specific attribute of a toy construction element meaning a surprise present for children. It may also be conceivable that the user to some extend may have to figure out at least some of the rules in a simple trial and error game using the system 1 to define and visualize orders from toy construction models without submitting unless the user confirms the correctness of the order. A trial and error approach may also be particularly useful when a deliverable is defined as a combination of different items, such as a customizable piece of clothing or other retail item. The user C may, for example make a base selection of a type of product and then try different customization options by combining the base selection item, as represented by a base model made of one or more toy construction elements, with different decoration selection items, as represented by one or more further toy construction elements added to the base model.

In a restaurant context, non-limiting examples for a base selection may include a selection of a meal or a drink. Non-limiting examples for different customization options may include the selection of side dishes, a selection of a sauce or topping, a size of the serving, or a decoration according to a particular theme, e.g. "birthday", "sports", "science-fiction", or "fantasy". In a non-food context, non-limiting examples for a base selection may include: a piece of clothing, such as a T-shirt, shorts, or sneakers; practical products, such as a lunch box, a storage box, a school bag, or a pencil case; or toys, such as a toy-figure or a toy construction set. Non-limiting examples for different customization options may include selecting a decorative theme, such as "science fiction", "adventure", "fantasy", or "fairy tail", selecting add-on options/extras/services, or including a personalized print on the base selection, such as a souvenir photograph, a name, or a personal message.

EXAMPLE

FIGS. 10-*a* through 10-*f* illustrate by way of example the order definition process as implemented in a restaurant context, where a guest orders from a menu using e.g. a scan unit 1 as the ones described above. Such a scan unit 1 may be e.g. placed on each table in the restaurant.

FIG. 10*a* shows a page of the restaurant menu 200 listing a choice of different items 201. Each of the items 201 is graphically identified by an icon 202 illustrating a corresponding deliverable and a more detailed textual description 203 of the deliverable. The items 201 are each connected to a uniquely distinguishable toy construction element, which on the page shown here are so-called 2×1 bricks that are distinguishable by their colour. For example, the RED 2×1 brick means the fish dish (salmon). Other pages may refer to other brick shapes and colours, such as roof bricks, 1×1 bricks, or 4×1 bricks, all in different colours depending on the item they represent. A plurality of suitable toy construction elements are made available to the guest, e.g. in a reservoir next to the scan unit. The guest picks the bricks according to the set of rules thus given on the one or more pages of the restaurant menu 200 and builds a small toy construction model 99 from these bricks as illustrated in FIG. 10-*b*. While some simple rules may apply, e.g. requiring a single layered "flat" structure in order to simplify the scanning process or for making it more reliable, the system may be configured to discard any information on the exact geometry of the toy construction model 99 in order to allow for a playful freedom in expressing the selection, thus enhancing the creative experience and making the system more tolerant to the diversity that arises from playing. The guest then places the toy construction model 99 for scanning, e.g. on the scanning plate 2 of a scan unit 1 as shown in FIG. 10-*c*. The scanning plate 2 may be shaped as the drawer 20 shown in FIG. 10-*d*. The drawer 20 has an attachment surface 21 with studs 24 for attaching the toy construction model 99 thereto, and a tray surface 22 for supporting the toy construction model and for providing a single coloured background for image capture. The tray surface 22 is framed by colour fields 23 that are useful for colour calibration of the captured images. This is particularly useful for reliably analysing and distinguishing any relevant colour information in a captured digital representation of the toy construction model 99. The drawer 20 may further have a handle 25. The guest then slides the scanning plate 2 into the scan unit 1 as shown in FIG. 10-*e*. The toy construction model 99 is then scanned. Advantageously, the image capture and subsequent processing, is triggered automatically upon full insertion of the scanning plate 2 into the scan unit 1, e.g. by means of a magnetic, mechanical, capacitive or optical trigger switch.

The guest's toy construction model appears on a screen page 80 as a 3D representation 88 on the display 8 of the scan unit 1 in connection with the guest's menu selection 81*a*-*d* as illustrated in FIG. 10-*f*. The guest may be identified as a grown-up person as indicated by display field 82. The guest may now confirm the selection, e.g. by touching a corresponding button 83 on a touch-sensitive screen, and may submit the order by touching a yet further button 84, thereby sending the order e.g. via wireless communication to the kitchen for preparation.

What is claimed is:

1. A scan unit for use in an electronic ordering system, the scan unit comprising:
   a plurality of toy construction elements, each toy construction element comprising one or more coupling members configured for releasably interconnecting the toy construction elements with each other:
   a housing:
   a scanning device arranged in the housing, wherein the scanning device is operable to capture a digital representation of a toy construction model constructed from one or more of the plurality of toy construction elements; and
   a drawer that is insertable into the housing, wherein the drawer is adapted to receive a toy construction model constructed from one or more of the plurality of toy construction elements on a support surface so as to position said toy construction model for scanning by the scanning device when the drawer is in an inserted position in the housing.

2. The scan unit according to claim 1, wherein the scanning device comprises a camera adapted to capture one or more images of a toy construction model placed on the support surface of the drawer.

3. The scan unit according to claim 2, further comprising beam deflecting optics, such as mirror optics, wherein the beam deflecting optics are adapted to project an image of the toy construction model into the field of view of the camera.

4. The scan unit according to claim 1, further comprising an illumination device adapted to illuminate the toy construction model during a capture of the digital representation of the toy construction model.

5. The scan unit according to claim 1, wherein the support surface comprises one or more coupling members configured for releasably interconnecting the toy construction model with the support surface.

6. The scan unit according to claim 1, further comprising a trigger switch adapted for triggering the scanning device to perform a capture, wherein the trigger switch is arranged to be activated when the drawer is in the inserted position.

7. The scan unit according to claim 1, wherein the scanning device is a tablet computer.

8. The scan unit according to claim 7, wherein the housing includes one or more guide elements for positioning the tablet computer in the housing.

9. The scan unit according to claim 1, further comprising an identification information reader.

10. A scan unit for capturing graphical representations of toy construction models, the scan unit comprising:
   a housing;
   a scanning device situated in the housing, the scanning device is configured to capture a digital scan of a toy construction model constructed from toy construction elements; and
   a retractable drawer configured for insertion and extraction into and out of the housing, the drawer defining a support surface to situate the toy construction model for scanning inside of the housing when the drawer is in an inserted position in the housing.

11. The scan unit according to claim 10, wherein the scanning device comprises a camera adapted to capture images of the toy construction model.

12. The scan unit according to claim 11, further comprising beam deflecting optics configured to project an image of the toy construction model into a field of view of the scanning device.

13. The scan unit according to claim 10, further comprising an illumination device situated in the housing and configured to illuminate the toy construction model during capture of the digital scan of the toy construction model.

14. The scan unit according to claim 10, wherein the support surface comprises coupling members configured for releasably interconnecting the toy construction model with the support surface.

15. The scan unit according to claim 10, further comprising a trigger switch configured for triggering the scanning device to perform a capture, the trigger switch is configured to be activated when the drawer is inserted in the housing.

16. The scan unit according to claim 10, wherein the scanning device is a tablet computer.

17. The scan unit according to claim 16, wherein the housing includes guide elements for positioning the tablet computer in the housing.

18. The scan unit according to claim 10, further comprising an identification information reader.

\* \* \* \* \*